United States Patent
Daigle et al.

(10) Patent No.: US 10,964,948 B2
(45) Date of Patent: Mar. 30, 2021

(54) COPOLYMER BINDER

(71) Applicant: HYDRO-QUÉBEC, Montréal (CA)

(72) Inventors: Jean-Christophe Daigle, St-Bruno-de-Montarville (CA); Karim Zaghib, Longueuil (CA)

(73) Assignee: HYDRO-QUÉBEC, Montréal (CA)

( * ) Notice: Subject to any disclaimer, the term of this patent is extended or adjusted under 35 U.S.C. 154(b) by 239 days.

(21) Appl. No.: 16/094,687

(22) PCT Filed: Apr. 24, 2017

(86) PCT No.: PCT/CA2017/050505
§ 371 (c)(1),
(2) Date: Mar. 1, 2019

(87) PCT Pub. No.: WO2017/181294
PCT Pub. Date: Oct. 26, 2017

(65) Prior Publication Data
US 2019/0386310 A1      Dec. 19, 2019

(30) Foreign Application Priority Data

Apr. 22, 2016   (CA) .................................. 2928121
Apr. 26, 2016   (CA) .................................. 2928216

(51) Int. Cl.
*H01M 4/62*       (2006.01)
*C08F 212/08*     (2006.01)
(Continued)

(52) U.S. Cl.
CPC .......... *H01M 4/622* (2013.01); *C08F 212/08* (2013.01); *C08F 212/10* (2013.01); *H01M 10/0525* (2013.01); *C08F 2800/20* (2013.01)

(58) Field of Classification Search
None
See application file for complete search history.

(56) References Cited

U.S. PATENT DOCUMENTS

| 6,770,397 B1 | 8/2004 | Kouichiro et al. |
| 2004/0234851 A1 | 11/2004 | Kim et al. |
| (Continued) | | |

FOREIGN PATENT DOCUMENTS

| CN | 103682433 A | 3/2014 |
| JP | 2001035496 A | 2/2001 |
| JP | 2013110108 A | 6/2013 |

OTHER PUBLICATIONS

International Search Report (PCT/ISA/210) dated Jun. 29, 2017, by the Canadian Patent Office as the International Searching Authority for International Application No. PCT/CA2017/050505.
(Continued)

*Primary Examiner* — Daniel S Gatewood
(74) *Attorney, Agent, or Firm* — Buchanan Ingersoll & Rooney P.C.

(57) ABSTRACT

A copolymer including a monomer A with a molar ratio a varying between around 0.01 and around 0.20, a monomer B with a molar ratio b varying between around 0.2 and around 0.4, and a monomer C with a molar ratio c varying between around 0.50 and around 0.70, the monomer A being a hydrophilic monomer including a pendant chain of poly (ethylene oxide) (POE) with low molar weight, the monomer B being a hydrophobic monomer with a glass transition temperature (Tg) of around −30° C. or less, the monomer C being a monomer that is more hydrophobic than the monomer B and having a glass transition temperature (Tg) of around 80° C. or more, said monomers being organised in a hydrophilic segment, a hydrophobic segment and an intermediate segment located between the hydrophilic segment and the hydrophobic segment.

21 Claims, 7 Drawing Sheets

(51) Int. Cl.
*C08F 212/10* (2006.01)
*H01M 10/0525* (2010.01)

(56) References Cited

U.S. PATENT DOCUMENTS

2010/0010103 A1 1/2010 Schmidt et al.
2011/0207841 A1* 8/2011 Kosar .................. C08L 53/00
                                                    521/134

OTHER PUBLICATIONS

Written Opinion (PCT/ISA/237) dated Jun. 29, 2017, by the Canadian Patent Office as the International Searching Authority for International Application No. PCT/CA2017/050505.
Fedelich et al., "Application Handbook Thermal Analysis of Polymers, in Selected Applications Thermal Analysis" Mettler Toledo, (Jan. 1, 2013), URL:https://www,mt.com/dam/LabDiv/guides-glen/ta-polymer/TA_Polymers_Slected_Apps_EN.pdf. (40 pages).
Yamamoto, H. et al. "SBR Binder (for Negative Electrode) and ACM Binder (for Positive Electrode)" Science and Technologies, Chapter 7, 2009, pp. 163-179.
Guerfl, A. et al. "LiFePO4 water-soluble binder electrode for Li-ion batteries" Journal of Power Sources, 2007, vol. 163, pp. 1047-1052.
Lux, S. F. et al. "Low Cost, Environmentally Benign Binders for Lithium-Ion Batteries" Journal of the Electrochemical Society, vol. 157, No. 3, 2010, pp. A320-A325.
Tran, B. et al. "Adhesive PEG-based binder for aqueous fabrication of thick Li4Ti5O12 electrode" Electrochimica Acta, vol. 88, 2013, pp. 536-542.
Chou, S. L. et al. "Small things make a big difference: binder effects on the performance of Li and Na batteries" Physical Chemistry Chemical Physics, vol. 16, 2014, pp. 20347-20359.
Lee, J. T. et al. "A novel and efficient water-based composite binder for LiCoO2 cathodes in lithium-ion batteries" Journal of Power Sources, 2007, vol. 173, pp. 985-989.
Cai, Z. P. et al. "Preparation and performances of LiFePO4 cathode in aqueous solvent with polyacrylic acid as a binder" Journal of Power Sources, 2009, vol. 189, pp. 547-551.
Gong, L. et al. "High polar polyacrylonitrile as a potential binder for negative electrodes in lithium ion batteries" Electrochemistry Communications, vol. 29, 2013, pp. 45-47.
Park, H. K. et al. "Effect of high adhesive polyvinyl alcohol binder on the anodes of lithium ion batteries" Electrochemistry Communications, vol. 13, 2011, pp. 1051-1053.
Nguyen, D. et al. "Pigment Encapsulation by Emulsion Polymerization Using Macro-RAFT Copolymers" Langmuir, 2008, vol. 24, pp. 2140-2150.
Nguyen M. H. T. et al. "Application of a new acrylonitrile/butylacrylate water-based binder for negative electrodes of lithium-ion batteries" Electrochemistry Communications, vol. 35, 2013, pp. 45-48.
Daigle, J. C. et al. "A functional polymer with chemically switchable crystallinity" Polymer Chemistry, vol. 4, 2013, pp. 449-452.
Kessel, N. et al. "The diacetone acrylamide crosslinking reaction and its influence on the film formation of an acrylic latex" Journal of Coatings Technology Research, 2008, vol. 5, No. 3, pp. 285-297.
Pich, A. et al. "Preparation of PEGMA-functionalized latex particles. 1. System styrene/PEGMA" Colloid and Polymer Science, 2003, vol. 281, pp. 907-915.
Notice of Reasons for Refusal in corresponding Japanese Patent Application No. 2018-553389, dated Feb. 1, 2021, 10 Pages (with English-language machine translation).

* cited by examiner

COPOLYMER BINDER

FIELD OF THE INVENTION

The present invention relates to a copolymer binder useful as a binder for lithium-ion battery electrodes.

BACKGROUND OF THE INVENTION

Secondary lithium-ion batteries are used as energy sources in laptop computers, cellular telephones, electric tools and electronic and communication devices, where they make it possible to reduce size and weight. In recent years, lithium-ion secondary batteries have also been used for electric cars and hybrid cars. There is a strong demand for secondary lithium-ion batteries with a high performance, large capacity, and long lifetime for the latter applications.

A secondary lithium-ion battery typically includes a positive electrode including a lithium metal compound such as a lithium and cobalt oxide or a material of the olivine type (for example $LiMPO_4$ (where M=Fe, Mn, Co and/or Ni) as active material; a negative electrode including a carbonaceous material such as graphite as active material; and an electrolytic solution (electrolyte) typically including carbonates as solvent. A secondary lithium-ion battery is charged and discharged by the movement of the lithium ions between the positive electrode and the negative electrode.

The positive electrode is typically obtained by applying a fixed suspension made up of the active material and a binder on the surface of a positive electrode current collector such as an aluminum sheet, by drying the suspension, then cutting the current collector to an appropriate size.

Similarly, the negative electrode is obtained by applying a fixed suspension made up of the active material and a binder on the surface of a negative electrode current collector such as a copper sheet, by drying the suspension, then cutting the current collector to an appropriate size.

The binders used for the electrodes of secondary lithium-ion batteries serve to bind the active materials to one another and to bind the active materials to the current collector to prevent the unsticking of the active materials from the surface of the current collector.

Polymeric binders are widely used to assist with the cohesion and adhesion of the active materials of batteries on the collector. These binders are typically electrochemically inactive, stable and chemically inert polymers. They contribute significantly to the mass and the stability of the battery.

At this time, the most used polymer as binder is poly (vinyl difluoride) (PVDF). This polymer is typically dissolved in a toxic solvent (N-methyl pyrrolidone, NMP)) with a very high boiling temperature (202° C.). Although this polymer is very effective as a binder and is electrochemically inert, it comprises substantial problems in terms of its industrial use, such as a high production cost and a substantial energy demand to evaporate the solvent during the manufacture of electrodes. Furthermore, from an electrochemical perspective, its use in a battery with a liquid electrolyte causes LiF formation, which accelerates the chemical breakdown of the PVDF. Another factor that accelerates the breakdown speed of the electrode is the lack of flexibility of the PVDF; the contraction and expansion effects caused by the cycling creating the formation of cracks in the electrode.

Another polymeric coating traditionally used consists of a mixture of styrene-butadiene rubber (SBR) and methylcellulose (CMC). The SBR allows good adhesion to the collector, while the CMC helps thicken the dispersion and the adhesion of the active materials to one another. However, the SBR has a negative impact on the conductivity of the electrode. Furthermore, although this mixture is very effective in the case of $LiFePO_4$ and LTO ($Li_4Ti_5O_{12}$), it is not very effective in the case of LCO ($LiCoO_2$) for example.

Poly(acrylonitrile) (PAN), poly(acrylic acid) (PAA) and poly(vinyl acid) (PVA) have also been used as polymeric binder for electrodes. However, their glass transition higher than the ambient temperature causes a lack of flexibility.

BRIEF DESCRIPTION OF THE INVENTION

The present invention relates to:
1. A copolymer comprising:
   a monomer A with a molar ratio a varying between around 0.01 and around 0.20, preferably between around 0.05 and around 0.10,
   a monomer B with a molar ratio b varying between around 0.15 and around 0.4, preferably between around 0.15 and around 0.30, and
   a monomer C with a molar ratio c varying between around 0.50 and around 0.70, preferably between around 0.60 and around 0.70,
   the monomer A being a hydrophilic monomer comprising a pendant chain of poly(ethylene oxide) (POE) with a low molar mass,
   the monomer B being a hydrophobic monomer with a glass transition temperature (Tg) of around −30° C. or less,
   the monomer C being more hydrophobic than the monomer B and having a glass transition temperature (Tg) of around 80° C. or more, said monomers being organized in:
   a hydrophilic segment,
   a hydrophobic segment, and
   an intermediate segment located between the hydrophilic segment and the hydrophobic segment,
   the intermediate segment having a hydrophilicity midway between the hydrophilicity of the hydrophilic segment and the hydrophilicity of the hydrophobic segment,
   the hydrophilic segment comprising the monomer A and part of the monomer B, and the intermediate segment and the hydrophobic segment comprising the rest of the monomer B as well as the monomer C, the intermediate segment being enriched with the monomer B relative to the hydrophobic segment and the hydrophobic segment being enriched with the monomer C relative to the intermediate segment.
2. The copolymer according to item 1, wherein the copolymer further comprises a monomer D, which is a monomer chemically cross-linkable in water, in a molar ratio d varying between around 0 and around 0.10.
3. The copolymer according to item 1 or 2, wherein the copolymer has the following formula:

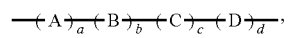

wherein:
   A, B, C and D respectively representing the monomers A, B, C and D and
   a, b, c and d respectively representing the molar ratios a, b, c and d.
4. The copolymer according to any one of items 1 to 3, wherein the molar mass of the pendant chain of POE varies between around 300 and around 2000 g/mol, preferably between around 300 and around 1000 g/mol, and more preferably between around 300 and around 500 g/mol.

5. The copolymer according to any one of items 1 to 4, wherein the monomer A is polyethylene glycol methyl acrylate or polyethylene glycol methyl methacrylate.

6. The copolymer according to item 5, wherein the monomer A has the formula:

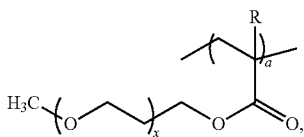

wherein R is a hydrogen atom or a methyl group and x represents a number of POE repetition units such that the molar mass of the POE chain is as defined in item 4.

7. The copolymer in any one of items 1 to 6, wherein the glass transition temperature (Tg) of the monomer B varies between around −30° C. and about −60° C.

8. The copolymer in any one of items 1 to 6, wherein the glass transition temperature (Tg) of the monomer B is around −40° C. or less, 9. The copolymer in any one of items 1 to 6, wherein the glass transition temperature (Tg) of the monomer B varies between around −40° C. and about −60° C.

10. The copolymer according to any one of items 1 to 9, wherein the monomer B is:
   n-butyl acrylate,
   another acrylate or methacrylate having a Tg of around −30° C. or less, in particular an alkyl acrylate or methacrylate, the alkyl being non-substituted or substituted, preferably at the chain end, with one or several hydroxy and/or alkoxy groups, the alkoxy being non-substituted or substituted, preferably at the chain end, with one or several hydroxy and/or alkoxy groups, preferably with an alkoxy group;
   butyl vinyl ether, or
   a mixture thereof.

11. The copolymer according to item 10, wherein the monomer B is n-butyl acrylate, iso-decyl acrylate, n-decyl methacrylate, n-dodecyl methacrylate, 2-ethylhexyl acrylate, 2-(2-ethoxyethoxy)ethyl acrylate, 2-hydroxyethyl acrylate, 2-methoxyethyl acrylate, n-propyl acrylate, glycol methyl ether acrylate ethylene, butyl vinyl ether, or a mixture thereof.

12. The copolymer according to item 11, wherein the monomer B is n-butyl acrylate or butyl vinyl ether.

13. The copolymer according to item 12, wherein the monomer B is n-butyl acrylate.

14. The copolymer according to any one of items 1 to 13, wherein the monomer C is styrene or a derivative thereof, acrylonitrile, Vinazene™ (a derivative of imidazole, more particularly 2-vinyl-4,5-dicyanoimidazole), methyl methacrylate, tert-butyl methacrylate, acryloylmorpholine, phenyl methacrylate, vinylferrocene, ferrocenemethyl methacrylate or a mixture thereof.

15. The copolymer according to item 14, wherein the monomer C is styrene or acrylonitrile.

16. The copolymer according to item 15, wherein the monomer C is styrene.

17. The copolymer according to any one of items 1 to 16, comprising acrylamide diketone as monomer D.

18. The copolymer according to any one of items 1 to 17, wherein the monomer A is polyethylene glycol methyl acrylate or polyethylene glycol methyl methacrylate, the monomer B is n-butyl acrylate and the monomer C is styrene, preferably the copolymer has the following formula:

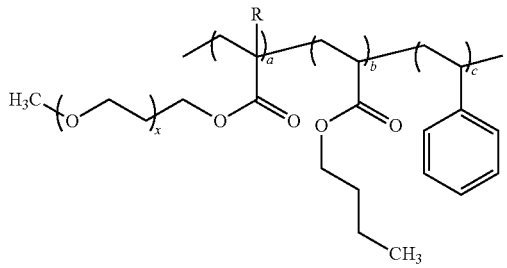

wherein R and x are as defined in item 6 and a, b and c are as defined in item 1.

19. The copolymer according to any one of items 1 to 18, wherein the copolymer further comprises acrylamide diketone as monomer D, preferably the copolymer has the following formula:

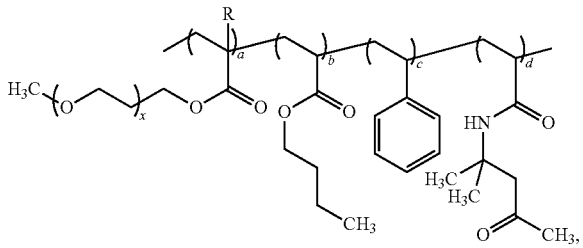

wherein R and x are as defined in item 6, a, b and c are as defined in item 1 and d is as defined in item 2.

20. The copolymer according to any one of items 1 to 19, wherein the glass transition temperature (Tg) of the copolymer is between around 0° C. and around 20° C. and preferably between around 5° C. and around 10° C.

21. The copolymer according to any one of items 1 to 20, wherein the molar mass ($M_n$) of the copolymer is between around 100,000 g/mol and around 300,000 g/mol, and preferably between 150,000 g/mol and around 200,000 g/mol.

22. A use of a copolymer as defined according to any one of items 1 to 21 as binder for a lithium-ion battery electrode.

23. A binder for a lithium-ion battery electrode comprising a copolymer as defined according to any one of items 1 to 21.

24. A binder suspension comprising a copolymer as defined according to any one of items 1 to 21 suspended in water.

25. The binder suspension according to item 24, comprising around 10% and around 20%, and preferably between around 10% and around 13%, in percentage by weight, of the copolymer based on the total weight of the suspension.

26. The binder suspension according to item 24 or 25, additionally comprising a surfactant.

27. The binder suspension according to item 26, comprising between around 3% and around 7%, in percentage by weight, of the surfactant based on the total weight of the suspension.

28. The binder suspension according to any one of items 24 to 27, wherein the copolymer is cross-linked.
29. A binder for a lithium-ion battery electrode comprising a binder suspension as defined in any one of items 24 to 28.
30. A use of the binder suspension as defined in any one of items 24 to 28 as binder for the lithium-ion battery electrode.
31. A method for manufacturing an electrode for a lithium-ion battery comprising the following steps:
    a) forming a binder suspension as defined in any one of items 24 to 28,
    b) adding an active material to the binder suspension, thus forming a suspension for the electrode,
    c) applying the suspension for the electrode to the surface of an electrode current collector, and
    d) drying, thus forming a membrane on the electrode current collector.
32. The method according to item 30, wherein step a) comprises cross-linking of the copolymer via the monomer D.
33. The method according to item 31, wherein step a) uses a dihydrazine or dihydrazide compound as cross-linking agent for the cross-linking of the monomer D.
34. The method according to item 32, wherein step a) uses dihydrazide adipic acid as cross-linking agent.
35. The method according to any one of items 30 to 33, wherein the method further comprises, after step d), the step for cutting the electrode current collector to an appropriate size.
36. A suspension for an electrode, comprising a binder suspension as defined in any one of items 24 to 28 and additionally comprising an active material for a lithium-ion battery electrode.
37. The suspension for an electrode according to item 36, comprising between around 80% and around 95%, preferably between around 90% and around 95% or between around 80% and around 90%, in percentage by weight, of the active material based on the total dry weight of the suspension for an electrode.
38. The suspension for an electrode according to item 36 or 37, additionally comprising carbon black.
39. The suspension for an electrode according to item 38, comprising between around 1% and around 5%, preferably around 3%, in percentage by weight, of carbon black based on the total dry weight of the suspension for an electrode.
40. The suspension for an electrode according to any one of items 36 to 38, additionally comprising carbon fibers.
41. The suspension for an electrode according to item 40, comprising between around 1% and around 5%, preferably around 3%, in percentage by weight, of carbon fibers based on the total dry weight of the suspension for an electrode.
42. The suspension for an electrode according to any one of items 36 to 41, comprising between around 2% and around 15%, preferably between around 3% and around 10%, and more preferably between around 5% and around 10%, in percentage by weight, of the copolymer based on the total dry weight of the suspension for an electrode.
43. An electrode for a lithium-ion battery comprising an electrode current collector having, over at least part, preferably all, of its surface, a membrane formed by a mixture of the copolymer as defined in any one of items 1 to 21 and at least one active material.
44. A lithium-ion battery comprising a positive electrode, a negative electrode and an electrolytic solution in contact with the positive electrode and the negative electrode; the positive electrode and/or the negative electrode being an electrode according to the invention as defined according to item 38.

DETAILED DESCRIPTION OF THE INVENTION

Figure 1:
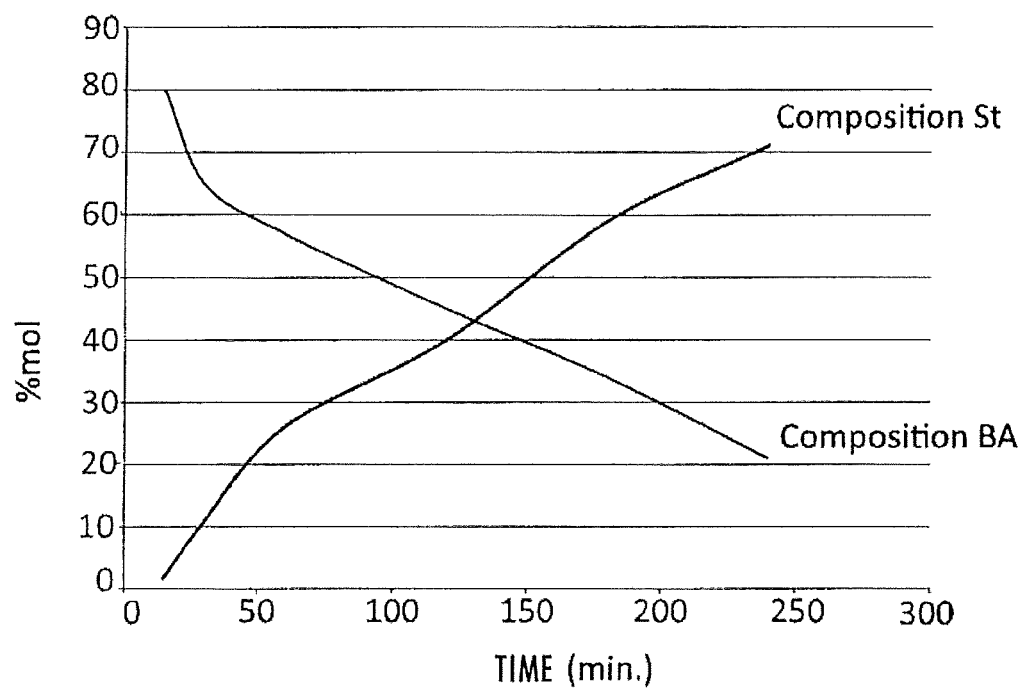
FIG. 1 shows the polymerization kinetics of the polymer of the half-cell 3 as monitored by NMR of the proton.

The present invention therefore relates to a copolymer comprising
    a monomer A with a molar ratio a varying between around 0.01 and around 0.20, preferably between around 0.05 and around 0.10,
    a monomer B with a molar ratio b varying between around 0.15 and around 0.4, preferably between around 0.15 and around 0.30, and
    a monomer C with a molar ratio c varying between around 0.50 and around 0.70, preferably between around 0.60 and around 0.70,
    the monomer A being a hydrophilic monomer comprising a pendant chain of poly(ethylene oxide) (POE) with a low molar mass, the monomer B being a hydrophobic monomer with a glass transition temperature (Tg) of around −30° C. or less, the monomer C being more hydrophobic than the monomer B and having a glass transition temperature (Tg) of around 80° C. or more,
    said monomers being organized in:
    a hydrophilic segment,
    a hydrophobic segment, and
    an intermediate segment located between the hydrophilic segment and the hydrophobic segment,
    the intermediate segment having a hydrophilicity midway between the hydrophilicity of the hydrophilic segment and the hydrophilicity of the hydrophobic segment,
    the hydrophilic segment comprising the monomer A and part of the monomer B, and the intermediate segment and the hydrophobic segment comprising the rest of the monomer B as well as the monomer C, the intermediate segment being enriched with the monomer B relative to the hydrophobic segment and the hydrophobic segment being enriched with the monomer C relative to the intermediate segment.

Thus, the copolymer therefore has a hydrophilicity gradient from the hydrophilic segment to the hydrophobic segment through the intermediate segment.

In preferred embodiments, the copolymer further comprises a monomer D, which is a monomer chemically cross-linkable in water, in a molar ratio d varying between around 0 and around 0.10, preferably between around 0.01 and around 0.10. The monomer D being hydrophilic and water-soluble, it is found in the hydrophilic segment of the copolymer.

In preferred embodiments, the copolymer has the following formula:

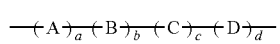
(Formula 1)

wherein:
A, B, C and D respectively representing the monomers A, B, C and D and
a, b, c and d respectively representing the molar ratios a, b, c and d.

As mentioned above, the copolymer according to the invention comprises segments with different hydrophilicities: In other words, the copolymer is amphiphilic. The advantages of this feature will be explained the following sections.

Therefore, still as mentioned above, a, b, c and d are molar ratios. In other words, for example, $$a = \frac{\text{number of monomer } A}{\text{total number of monomer in the copolymer}}.$$

Thus as a result, the sum of these molar ratios, (a+b+c) or, if the monomer D is present (a+b+c+d), is necessarily equal to 1. It will be noted that d varies between around 0 and around 0.10. When d is 0, the monomer D is absent.

As mentioned above, the monomer A is a POE derivative with a low molar mass, this last feature making it possible to avoid crystallization of the POE pendant chains. In certain embodiments of the invention, the molar mass of the POE pendant chain varies between around 300 and around 2000 g/mol, preferably between around 300 and around 1000 g/mol, and more preferably between around 300 and around 500 g/mol.

In preferred embodiments of the invention, the monomer A is for example a glycol polyethylene methyl acrylate or a glycol polyethylene methyl methacrylate. Thus, the monomer A has the formula:

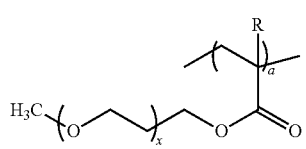
(Formula 2)

wherein R is a hydrogen atom or a methyl group and x represents a number of POE repetition units such that the molar mass of the POE chain is as defined above.

In embodiments of the invention, the monomer B for example has a Tg between about −30° C. and about −60° C.

In embodiments, the monomer B has a Tg of −40° C. or less, for example a Tg between about −40° C. and about −60° C.

In preferred embodiments of the invention, the monomer B may for example be:
n-butyl acrylate,
any other acrylate or methacrylate having an appropriate Tg, in particular an alkyl acrylate or methacrylate, the alkyl being non-substituted or substituted, preferably at the chain end, with one or several hydroxy and/or alkoxy groups, the alkoxy being non-substituted or substituted, preferably at the chain end, with one or several hydroxy and/or alkoxy groups, preferably with an alkoxy group; such as iso-decyl acrylate, n-decyl methacrylate, n-dodecyl methacrylate, 2-ethylhexyl acrylate, 2-(2-ethoxyethoxy)ethyl acrylate, 2-hydroxyethyl acrylate, 2-methoxyethyl acrylate, n-propyl acrylate, glycol methyl ether acrylate ethylene, etc.,
butyl vinyl ether, or
a mixture thereof.

In preferred embodiments of the invention, the monomer B is n-butyl acrylate or butyl vinyl ether, preferably n-butyl acrylate.

Hereinafter, the terms "alkyl" and "alkoxy" (i.e., —O-alkyl) refer, in preferred embodiments, to groups comprising from 1 to 20, preferably from 1 to 12, carbon atoms.

In preferred embodiments of the invention, the monomer C is for example styrene and derivative thereof, acrylonitrile, Vinazene™ (a derivative of imidazole, more particularly 2-vinyl-4,5-dicyanoimidazole), methyl methacrylate, tert-butyl methacrylate, acryloylmorpholine, phenyl methacrylate, vinylferrocene, ferrocenemethyl methacrylate or a mixture thereof. In preferred embodiments of the invention, the monomer C is styrene or acrylonitrile, preferably styrene.

In some embodiments of the invention, the monomer D is absent.

However, in some other embodiments of the invention, the monomer D is present. In preferred embodiments, the monomer D is for example acrylamide diketone.

In some embodiments of the invention, the copolymer is not cross-linked. In other embodiments, the copolymer is cross-linked via the monomer D.

In preferred embodiments of the invention, the copolymer comprises polyethylene glycol methyl acrylate or polyethylene glycol methyl methacrylate as monomer A, n-butyl acrylate (Tg≈−49° C.) as monomer B and styrene (Tg≈90° C.) as monomer C. As a result, the copolymer therefore has the following formula:

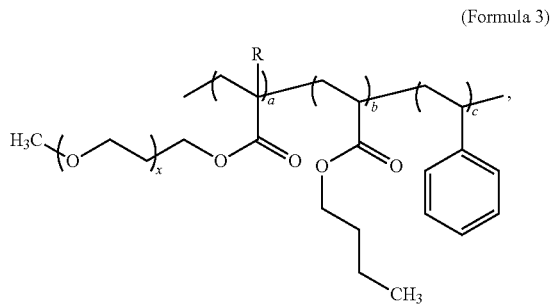
(Formula 3)

wherein R is a hydrogen atom or a methyl group and x, a, b and c are as defined above. In certain specific embodiments of the invention, this copolymer additionally comprises acrylamide diketone as monomer D and therefore has the following formula:

(Formula 4)

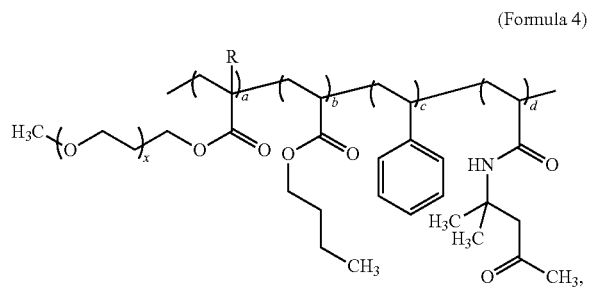

wherein R is a hydrogen atom or a methyl group and x, a, b, c and d are as defined above.

In embodiments of the invention, the glass transition temperature (Tg) of the copolymer is between around 0° C. and around 20° C. and preferably between around 5° C. and around 10° C.

In embodiments of the invention, the molar mass ($M_n$) of the copolymer is between around 100,000 g/mol and around 300,000 g/mol, and preferably between 150,000 g/mol and around 200,000 g/mol.

Method for Manufacturing the Copolymer

The copolymer described above can be manufactured by emulsion polymerization in water. To that end, the monomers are added in water. Depending on their solubility in the water, the monomers will be found in solution in the water (monomer A and, depending on the case, monomer D), in hydrophobic droplets that are not miscible in water (monomer C) or in both mediums (monomer B), which produces an emulsion that is used as reaction medium. A water-soluble radical polymerization initiator is used. The initiator may for example be potassium persulfate or any other water-soluble initiator. A nonionic surfactant, such as Triton X-100, is used to stabilize the emulsion.

Thus, in the reaction medium, the different monomers are found in the water and/or in hydrophobic droplets while the initiator is solubilized in the water. As a result, the polymerization begins with the monomers solubilized in the water (i.e., monomer A, a small part of monomer B and, if applicable, monomer D), thus creating the hydrophilic segment of the copolymer. The reaction continues with the polymerization of the monomers in the droplets (the majority of the monomer B and the monomer C), beginning mainly with the monomer B, thus creating the intermediate segment, and ending primarily with the monomer C, lastly creating the hydrophobic segment.

This reaction therefore produces the copolymer described above, which has a hydrophilicity gradient that can be described as having the hydrophilic, intermediate and hydrophobic segments as they are described above.

Use of the Copolymer

The present invention also relates to the use of the copolymer described above as binder for a lithium-ion battery electrode, and therefore a binder for a lithium-ion battery electrode comprising said copolymer.

The present invention also relates to a binder suspension. In certain embodiments of the invention, the binder suspension comprises the copolymer described above suspended in water. In the present document, reference will sometimes be made to said binder suspension as a "latex". This suspension may be used as binder for a lithium-ion battery electrode, and the invention therefore relates to a binder for a lithium-ion battery electrode comprising said binder suspension. In preferred embodiments, said binder suspension comprises between around 10% and around 20%, and preferably between around 10% and around 13%, in percentage by weight, of the copolymer based on the total weight of the suspension.

In preferred embodiments, said binder suspension additionally comprises a surfactant in order to stabilize the suspension. In preferred embodiments, said binder suspension comprises between around 3% and around 7%, in percentage by weight, of the surfactant based on the total weight of the suspension.

The present invention also relates to a binder suspension as described above, in which the copolymer is cross-linked.

In certain embodiments of the invention, the binder suspension is made up of the reaction mixture in which the copolymer was manufactured. It is in fact possible to reuse said mixture directly, by diluting it with water as needed.

The present invention also relates to a method for manufacturing an electrode for a lithium-ion battery. This method comprises the following steps:
a) providing a binder suspension as described above,
b) adding an active material to the binder suspension, thus forming a suspension for the electrode,
c) applying the suspension for the electrode to the surface of an electrode current collector, and d) drying, thus forming a membrane on the electrode current collector.

In some embodiments of the invention, step a) comprises cross-linking the copolymer via the monomer D. To that end, it is possible to add, to the binder suspension, a dihydrazine or dihydrazide compound, such as dihydrazide adipic acid, as cross-linking agent. The reaction occurs at ambient temperature in several minutes.

In some embodiments of the invention, said method further comprises, after step d), the step for cutting the electrode current collector to an appropriate size.

The present invention also relates to a suspension for an electrode, comprising a binder suspension as defined above, and additionally, an active material for a lithium-ion battery electrode. In preferred embodiments, this suspension for an electrode comprises between around 80% and around 95%, preferably between around 90% and around 95% or between around 80% and around 90%, in percentage by weight, of the active material based on the total dry weight of the suspension for an electrode.

Said suspension may also comprise other ingredients typically used in lithium-ion batteries, for example carbon black and/or carbon fibers. One example of carbon black is Denka™ Black AB HS-100 carbon black. One example of carbon fibers are VGCF™-H carbon fibers. In preferred embodiments, the suspension for an electrode comprises between around 1% and around 5%, preferably around 3%, in percentage by weight, of carbon black based on the total dry weight of the suspension for an electrode. In preferred embodiments, the suspension for an electrode comprises between around 1% and around 5%, preferably around 3%, in percentage by weight, of carbon fibers based on the total dry weight of the suspension for an electrode.

In certain embodiments of the invention, the suspension for an electrode (comprising the active material, the copolymer and, if applicable, the other ingredients) comprises between around 2% and around 15%, preferably between around 3% and around 10%, and more preferably between around 5% and around 10%, in percentage by weight, of the copolymer based on the total dry weight of the suspension for an electrode.

The present invention also relates to an electrode for a lithium-ion battery comprising an electrode current collector having, over at least part, preferably all, of its surface, a membrane formed by a mixture of the copolymer as described above and at least one active material and optionally said other ingredients, such as the carbon black and the carbon fibers.

In the embodiments of the invention described above, the electrode current collector, the active materials and the other ingredients, such as the carbon black and the carbon fibers, are electrode current collectors, active materials and ingredients conventionally used in the electrodes for lithium-ion batteries. These are well known by those skilled in the art.

Furthermore, the present invention also relates to a lithium-ion battery comprising a positive electrode, a negative electrode and an electrolytic solution in contact with the positive electrode and the negative electrode; the positive electrode and/or the negative electrode being an electrode according to the invention as described above.

In the embodiments of the invention described above, the electrolytic solution is an electrolytic solution conventionally used in lithium-ion batteries. Such solutions are well known by those skilled in the art.

Advantages of the Invention

In certain embodiments of the invention, one or another of the following advantages may be observed.

The solvent used, both for polymerization and for the suspension in order to manufacture the electrode, is water: a solvent that respects the environment and is inexpensive. Furthermore, the low boiling point of water (compared to the NMP) is beneficial in the method for manufacturing the electrodes at least in terms of decreasing energy costs.

Therefore, depending on the active materials, the suspension may not require a thickening agent (CMC). The amphiphilic nature of the copolymer indeed allows a better dispersion of the inorganic materials (active materials) in the suspension in order to manufacture the electrodes.

Furthermore, the copolymer may contribute to the ionic conductivity of the electrode. Thus, the binder would no longer be an inactive mass in the lithium-ion battery. More particularly, the hydrophilic part comprising poly(ethylene oxide) makes it possible to increase the flexibility, adhesion and ionic conductivity of the membrane on the electrode. Furthermore, POE is useful to disperse the inorganic particles and to stabilize the suspension, where it makes it possible to stabilize the polymer droplets. If the membrane is more flexible, the durability of the electrode increases, since crack formation in the electrodes during their use is limited.

The hydrophobic part is inter alia made up of a monomer having a high glass transition temperature, which makes it possible to modulate the overall glass transition temperature of the copolymer based on the needs for flexibility and adhesion specific to the electrode materials. In the case where this monomer, e.g., styrene, comprises an aromatic ring, the latter allows better dispersion of the carbon by pi stacking effect.

Furthermore, the stability of the electrode during cycling as well as the adhesion can be improved owing to the cross-linking of the copolymer via the monomer D.

Lastly, the preparation of the copolymer requires only one synthesis step.

Other aims, advantages and functions of the present invention will become apparent during the following description of possible embodiments, provided solely as examples, in connection with the following figures.

DESCRIPTION OF EMBODIMENTS OF THE INVENTION

The following ingredients were used:

| Acronym | Description | Function |
|---|---|---|
| PEGMA 300 PEGMA 500 | Poly(ethylene glycol) methacrylate, 300 g/mol and 500 g/mol 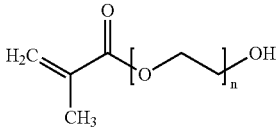 | Monomer A |
| nBA | N-butyl acrylate 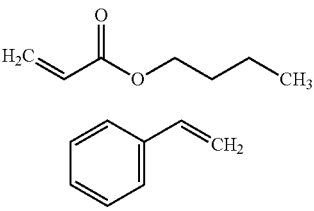 | Monomer B |
| Styrene | 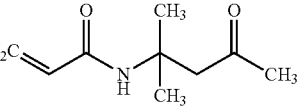 | Monomer C |
| Acrylamide diketone | 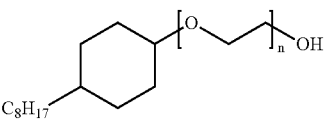 | Monomer D |
| Triton ™ X-100 | t-octylphenoxy-polyethoxyethanol 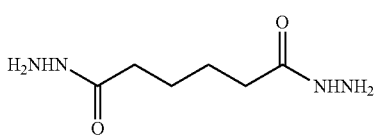 | Surfactant |
| KPS | Potassium persulfate | Polymerization initiator |
| Nanopure water | | Solvent |
| LFP | Lithium iron phosphate, LiFePO$_4$, grade P2 | Active material for electrode |
| ADH | Dihydrazide adipic acid | Cross-linking initiator |
| Denka | Denka ™ Black AB HS-100 carbon black; acetylene black (a carbon black obtained from the thermal decomposition of acetylene) | Carbon black |

-continued

| Acronym | Description | Function |
|---|---|---|
| VGCF-H | VGCF ™-H carbon fibers, vapor-synthesized carbon nanofibers with high crystallinity ("vapor grown carbon fibers") | Carbon fibers |

Polymers with the following formula were prepared:

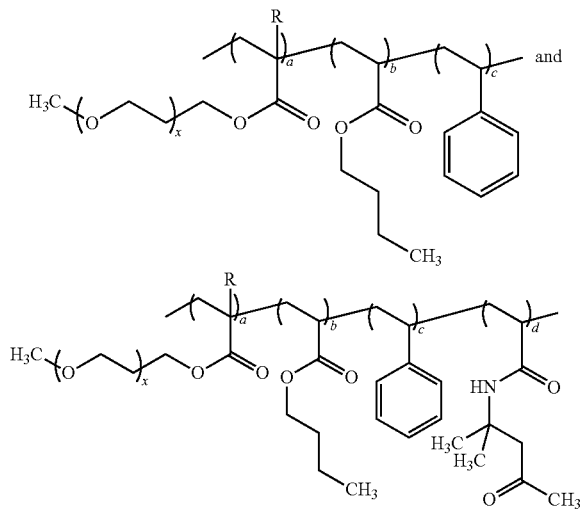

where, in both cases, R=methyl.

The following monomers in the following quantities were used to produce these polymers, which were next used in the half-cells identified below:

| Half-cell | 1a, 1b, 2a and 2b | 3 | 4 | 5 |
|---|---|---|---|---|
| PEGMA 300 | 2.0 g | 2.0 g | — | — |
| PEGMA 500 | — | — | 2.0 g | 2.0 g |
| nBA | 2.8 g | 2.8 g | 2.3 g | 1.8 g |
| Styrene | 5.2 g | 5.2 g | 5.2 g | 5.2 g |
| Acrylamide diketone | — | — | 0.5 g | 1.0 g |

The polymers were prepared in a 250 ml flask in which 80 ml of water was added with PEGMA 300 or 500 and 0.5 g of triton X-100. The reaction mixture was agitated until dissolution. The styrene and nBA were added to the flask, then the solution was agitated for 30 minutes at 750 rpm in order to create an emulsion. The emulsion was degassed under $N_2$ for 30 min, then 100 mg of KPS was added. The emulsion was heated to 80° C. under agitation for 8 hours under nitrogen.

The kinetics of this polymerization were analyzed by NMR of the proton. The results are shown in FIG. 1 for the polymer of the half-cell 3. This figure shows the preferential insertion of the nBA at the beginning of polymerization. Indeed, at the beginning of polymerization, the polymer contains a large quantity of nBA and little styrene, then the reverse is true at the end of polymerization. It should be noted that the PEGMA, not shown in FIG. 1, was completely polymerized during the first 15 min.

Next, suspensions for electrodes (slurries) were prepared. To that end, the reaction mixture resulting from the production of the copolymers was first homogenized in a roll mill for 72 h. A Thinky™ centrifugal planetary mixer was next used to incorporate the other ingredients therein (6 times 5 minutes of mixing). Lastly, the viscosity of the suspension was adjusting by adding water as needed to the mixture while agitating for 5 minutes with the Thinky™ mixer.

The suspensions for the different half-cells contained the following ingredients and showed the following viscosities and cross-linking percentages:

| Half-cell | 1a and 2a | 1b and 2b | 3 | 4 | 5 |
|---|---|---|---|---|---|
| LFP | 92.00% | 90.00% | 84.00% | 83.00% | 83.00% |
| Polymer of the invention (provided in the form of the reaction mixture 1a, 2a, 1b and 2b containing 10.8% solid matter) | 3.00% | 5.00% | — | — | — |
| Polymer of the invention (provided in the form of the reaction mixture 3 containing 12% solid matter) | — | — | 10.00% | — | — |
| Polymer of the invention (provided in the form of the reaction mixture 4 containing 12% solid matter) | — | — | — | 10.00% | — |
| Polymer of the invention (provided in the form of the reaction mixture 5 containing 12% solid matter) | — | — | — | — | 10.00% |
| ADH | — | — | — | 1.000% | 1.000% |
| Denka | 2.50% | 2.50% | 3.00% | 3.00% | 3.00% |
| VGCF-H | 2.50% | 2.50% | 3.00% | 3.00% | 3.00% |
| Cross-linking (%) | 0 | 0 | 0 | 1 | 0.5 |
| Viscosity (cps) | 1 | 1 | 19 | 11 | 10 |

Positive electrodes were produced by placing the suspensions on aluminum collectors by using Dr. Blade's technique. Next, the electrodes were dried for 1 h at 80° C. and next for 1 h at 120° C.

For comparison, electrodes were produced by replacing the polymers of the invention with poly(vinyl difluoride) (PVDF) or styrene-butadiene rubber (SBR) with methyl cellulose (CMC) (SBR/CMC).

The conductivity of the electrodes was measured in S/cm by a conductivity meter. Furthermore, the adhesion of the polymeric coating to the collector was measured in N/m by a T-peel by Instron™. The results obtained are shown below.

| Electrode | Conductivity (mS/cm) | Adhesion (N/m) |
|---|---|---|
| 1a | — | 4.4 |
| 1b | — | 7.4 |
| 2a | 3.1 | 21 |
| 2b | 2.6 | 21 |
| 3 | 3.0 | 119 |
| 4 | 3.3 | 155 |
| 5 | 3.9 | 152 |

One can see that the polymeric coatings containing the polymers of the invention have an excellent adhesion. As a comparison, the PVDF and the SBR/CMC respectively have an adhesion of 13 N/m and 10 N/m as measured in our facilities. When used at 5%, the invention makes it possible to have an adhesion of 21 N/m with no cross-linking agent. Furthermore, this value may be increased when cross-linking is used (compare inputs 3 and 4).

Figure 2:
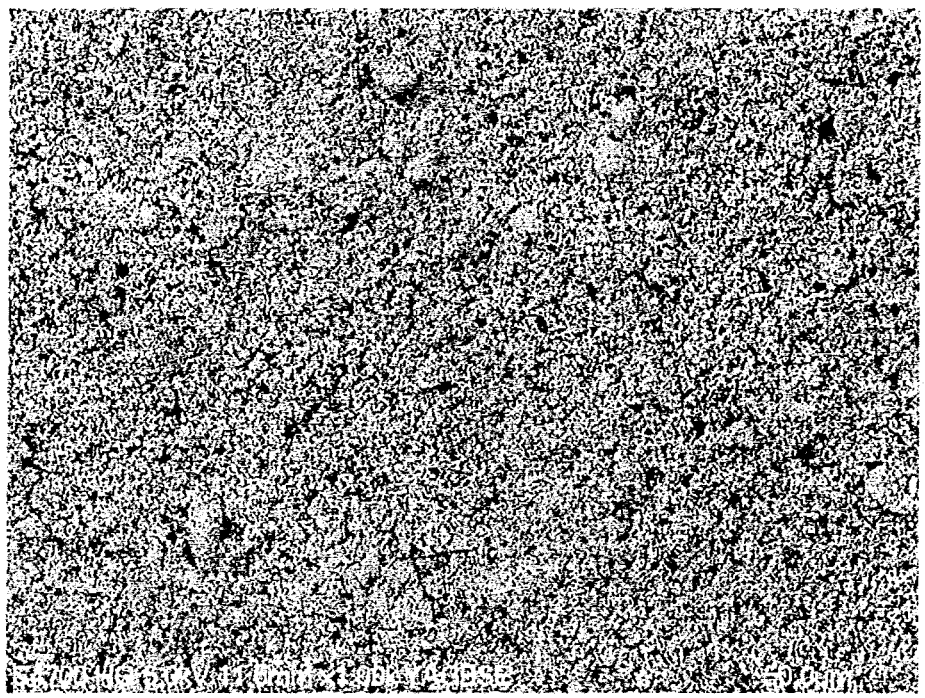
FIGS. 2 and 3 A) and B) are SEM images of the surface of an electrode according to one embodiment of the invention at different magnifications.
Figure 3A:
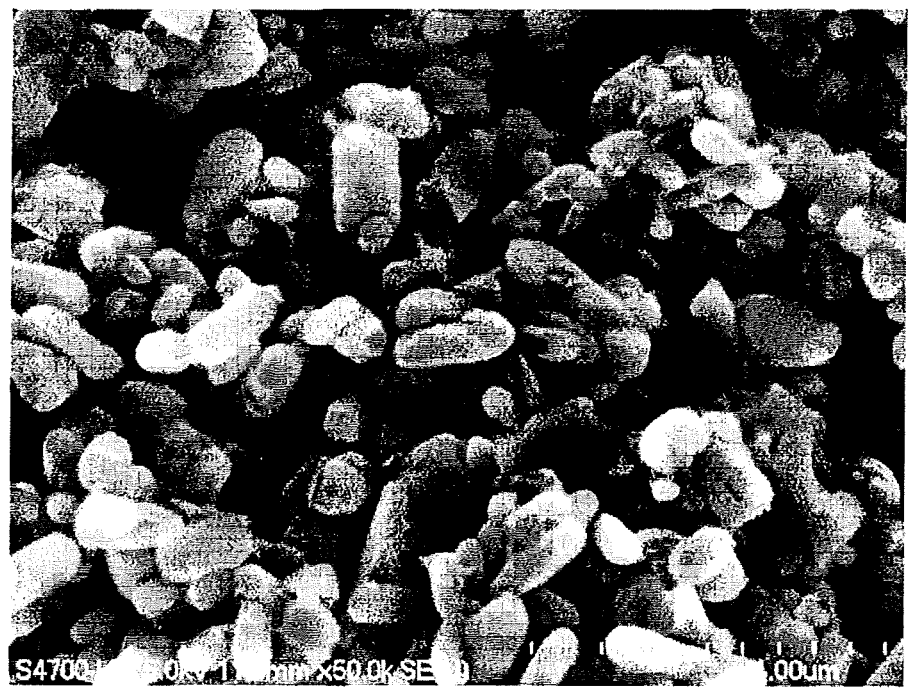
Figure 3B:
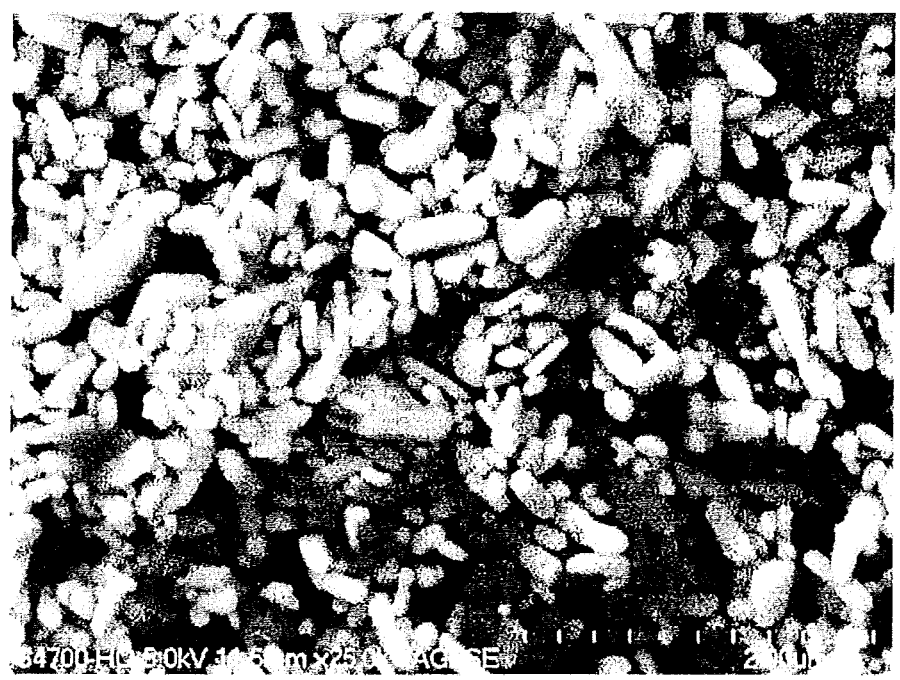
Figure 4:
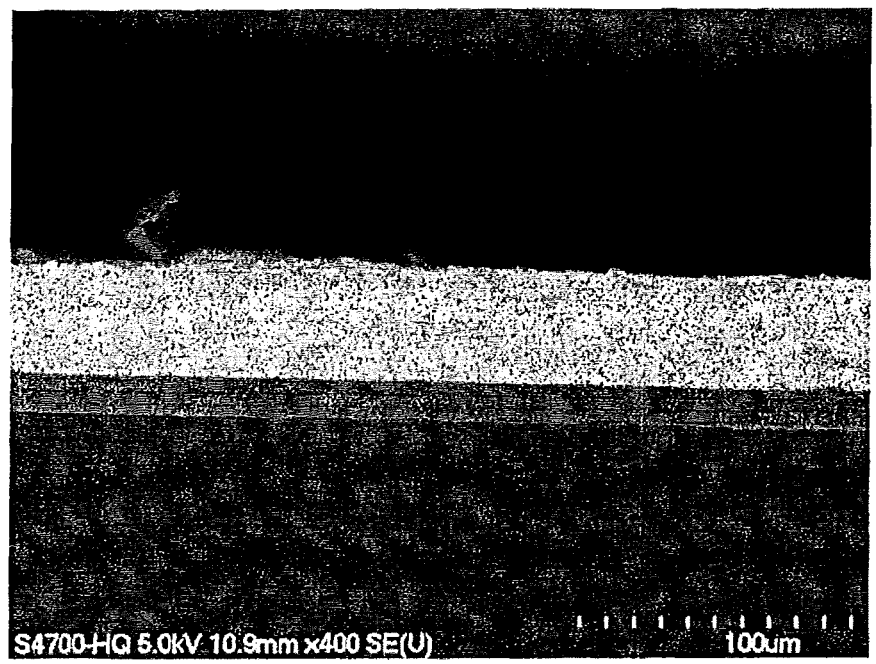
FIGS. 4 A) and B) are SEM images of a cross-section of an electrode according to one embodiment of the invention at different magnifications.
Figure 4:
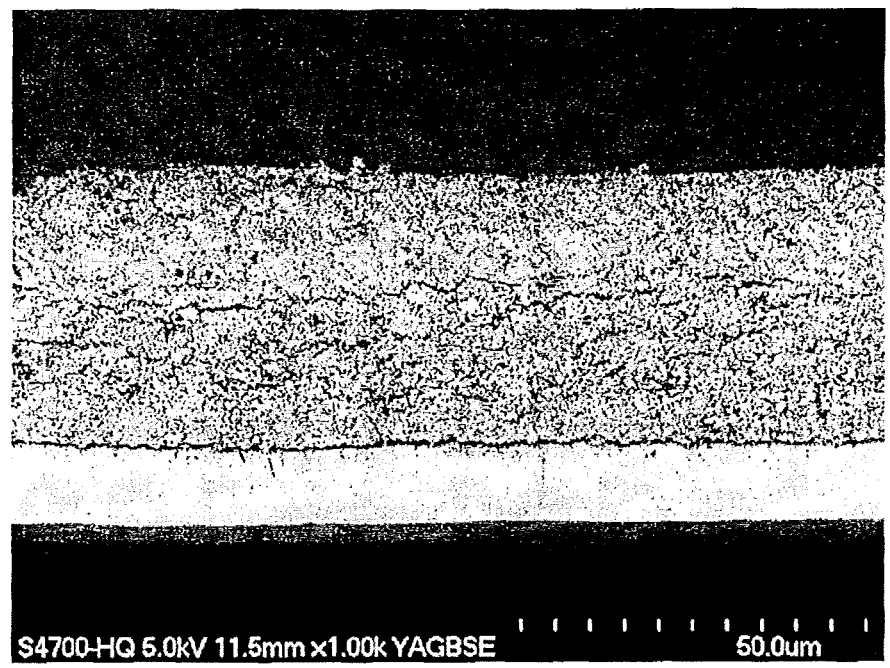

The electrodes were examined by scanning electron microscopy (SEM, FIGS. 2 to 4). FIGS. 2 and 3 show the surface of the electrode, while FIG. 4 shows a cross-section. The images in these figures show that the polymer (dark) makes it possible to disperse the particles of active material (lighter) homogeneously and that each of the particles is coated with polymer.

Figure 5:
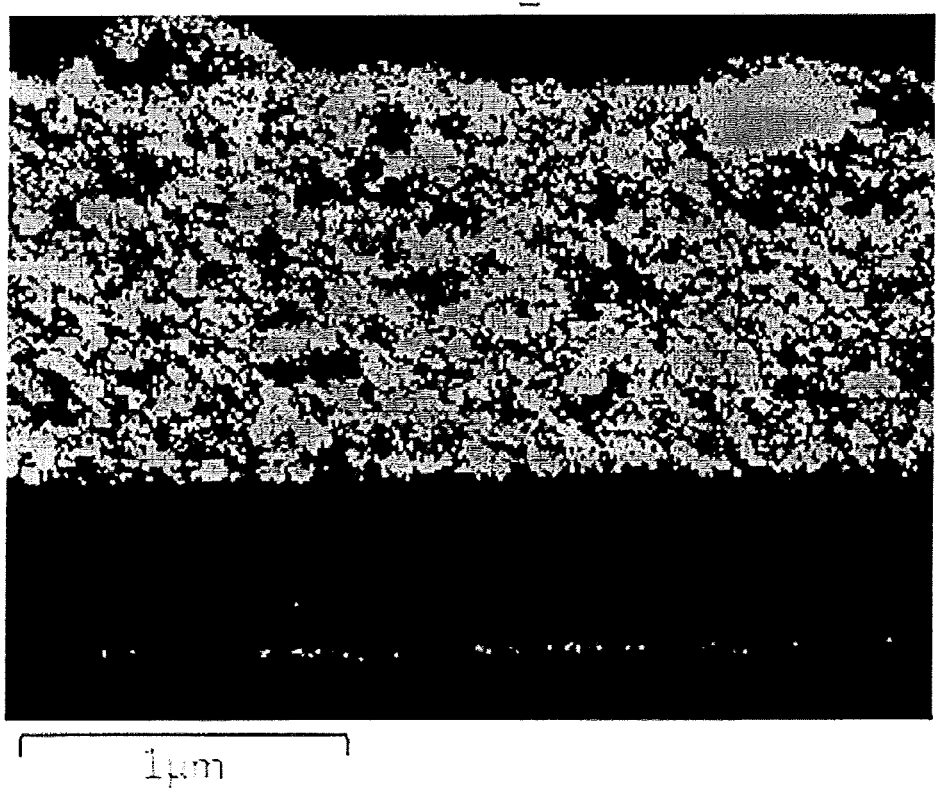
FIG. 5 shows an EDX image of a cross-section of an electrode according to one embodiment of the invention.

The electrodes were studied by energy dispersive analysis (EDX) of the carbon. FIG. 5 shows an EDX image of a cross-section of an electrode according to one embodiment of the invention. Once again, one can see the good dispersion and the homogeneity of the material making up the electrode.

Furthermore, the electrodes had the following thicknesses, densities and charges:

| Electrode | Thickness (µm) | Density (g/cm³) | Charge (mg/cm²) |
|---|---|---|---|
| 1b | 75 | 0.80 | 2.4-2.6 |
| 2b | 60 | 0.99 | 2.1-2.6 |
| 3 | 42 | 1.98 | 3.7 |
| 4 | 42 | 1.72 | 3.5 |
| 5 | 44 | 1.35 | 3.0-3.6 |
| PVDF | 46 | 1.90 | 4.9 |

Half-cells were manufactured from the above electrodes, a 200 µm lithium anode and an electrolyte (LiPF$_6$ in a mixture of ethylene carbonate and diethyl carbonate (EC-DEC) containing 2% vinyl carbonate (VC)).

The half-cells were studied at a potential of 2.0-4.0 V and a temperature of 25° C.

Figure 6:
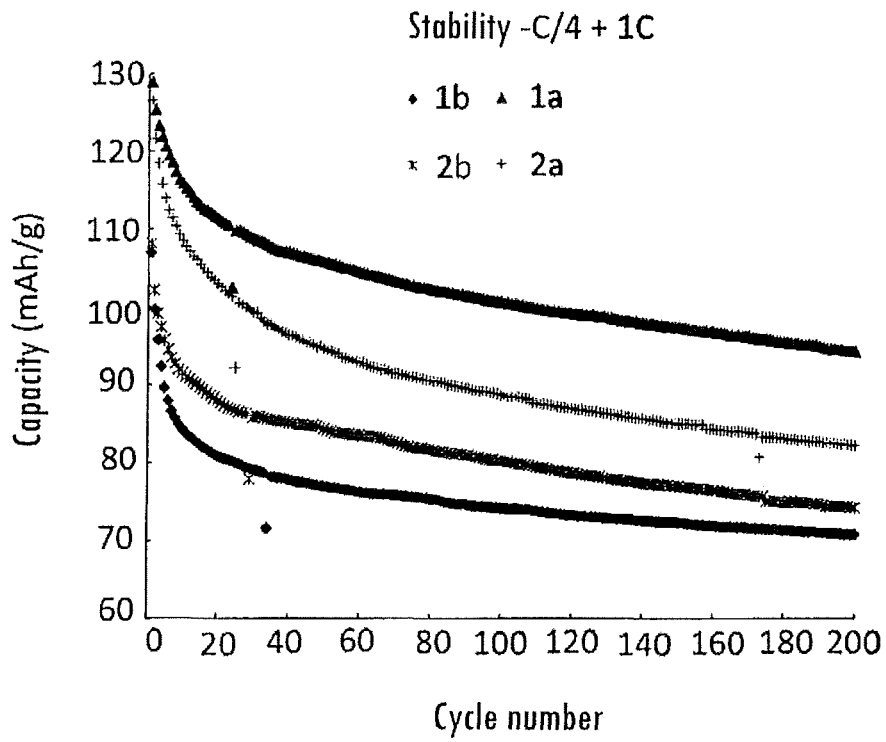
FIGS. 6 A) and B) show the capacity of the half-cells 1a, 1b, 2a and 2b and 3, 4 and 5 during 200 charge/discharge cycles.
Figure 6:
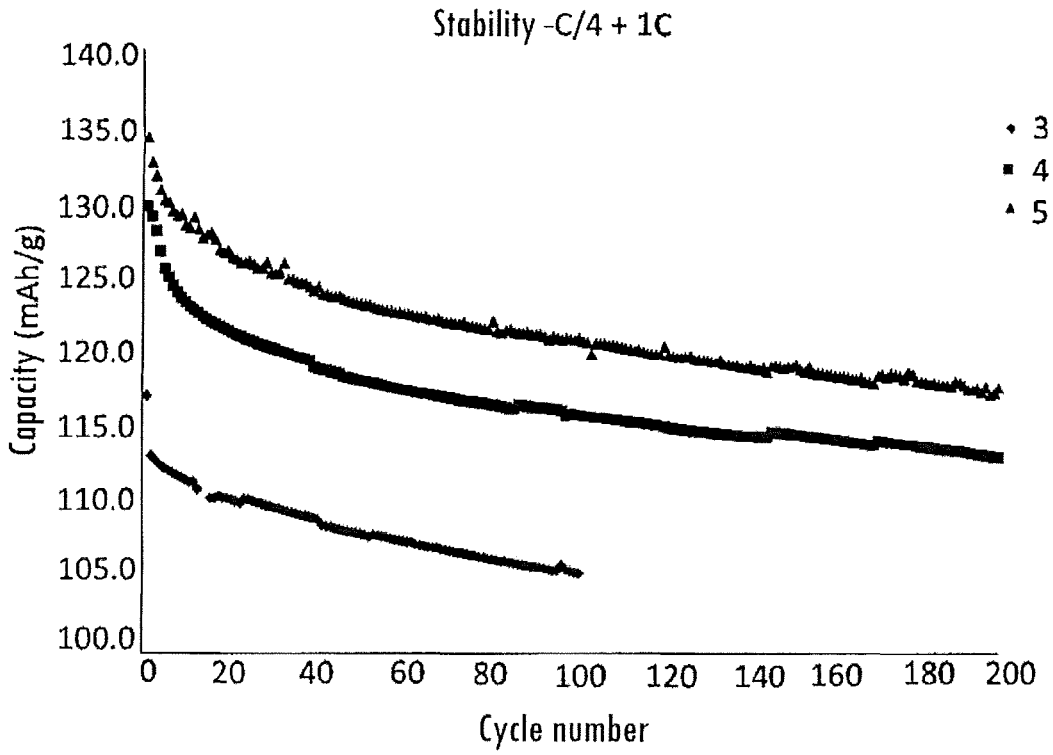

First, 200 charge/discharge cycles (−C/4+1C and −4/C+1C) were done to evaluate the stability of the capacity of the half-cells with use. The results are shown in FIGS. 6 A) and B).

Figure 7:
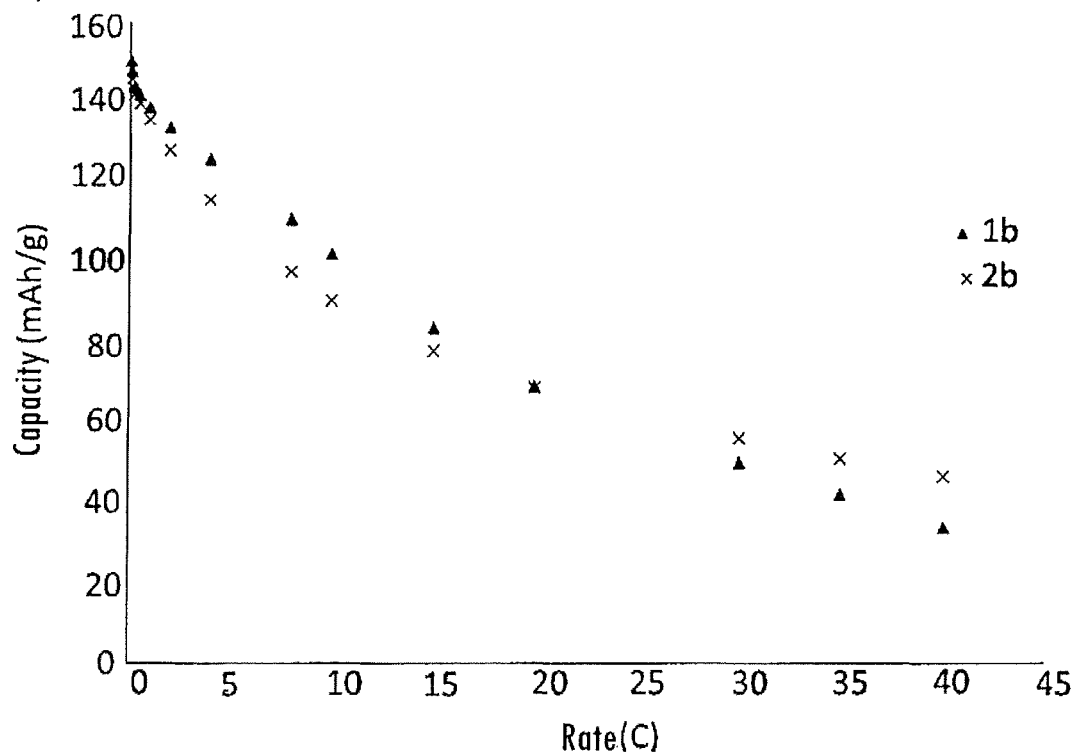
FIGS. 7 A) and B) show the capacity of the half-cells 1b and 2b and 3, 4 and 5 as a function of the charge rate.
Figure 7:
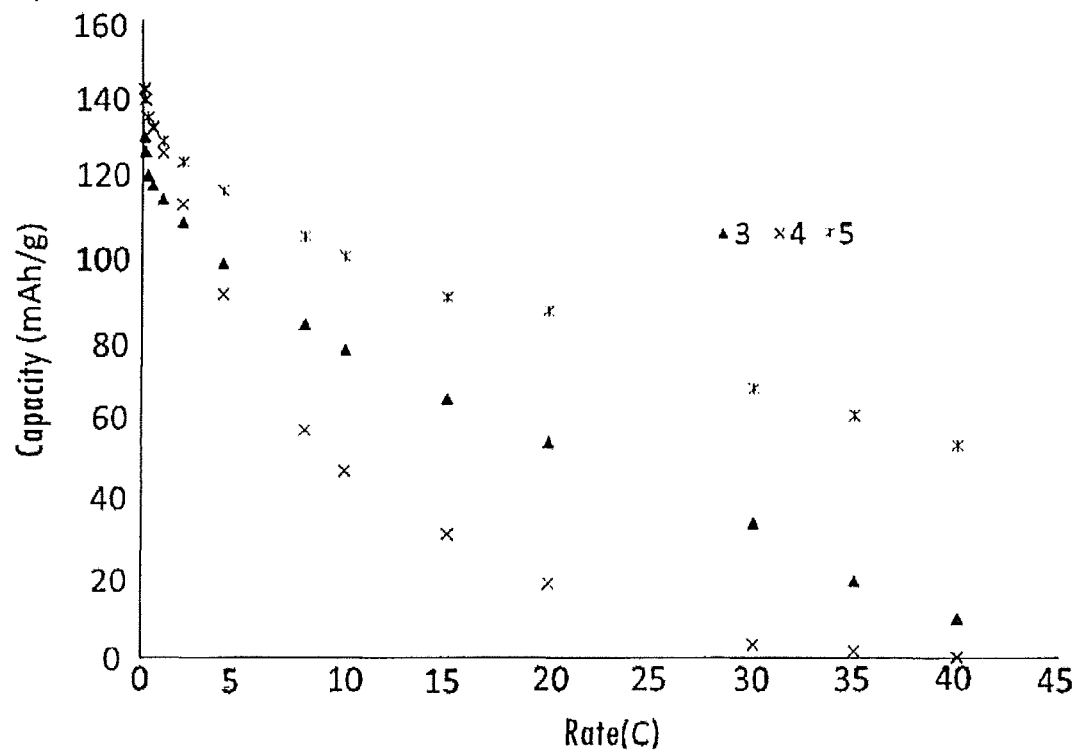

Next, the capacity of the half-cells as a function of the charge rate (Ragonne) was measured. The results are shown in FIGS. 7 A) and B).

Figure 8:
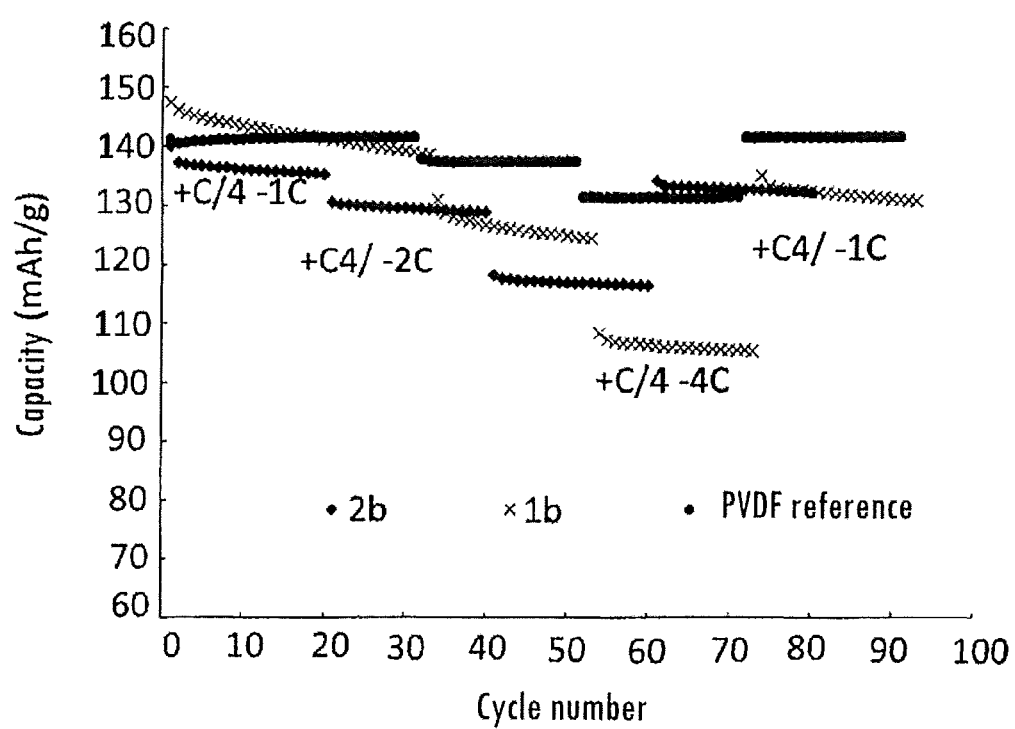
FIG. 8 shows the capacity of the half-cells 1b, 2b, and reference (PVDF) during 100 charge/discharge cycles at different discharge rates (+C/4−1 C; +C/4−3 C; +C/4−4 C and +C/4−1 C).

The stability of the half-cells during 100 charge/discharge cycles at different rates (+C/4 −1C; +C/4 −3C; +C/4 −4C and +C/4 −1C) was measured and is shown in FIG. 8.

The following results were also obtained:

| Half-cell | Capacity C/24 (mAh/g) | Capacity 1C (mAh/g) | Capacity 4C (mAh/g) | Capacity 10C (mAh/g) | Retention after 50 cycles (%) | Retention after 100 cycles (%) |
|---|---|---|---|---|---|---|
| 1a | 151 | 99 | 58 | 36 | 70 | 62 |
| 1b | 150 | 85 | 50 | 29 | 63 | 55 |
| 2a | 156 | 139 | 126 | 102 | 75 | nd |
| 2b | 154 | 136 | 116 | 91 | 81 | nd |
| 3 | 139 | 115 | 99 | 78 | 80 | 76 |
| 4 | 148 | 130 | 91 | 47 | 84 | 78 |
| 5 | 150 | 130 | 117 | 101 | 83 | 81 |

These electrochemical results show that these polymers allow good performances when they are used in electrochemical cells with a LFP cathode.

The scope of the claims must not be limited by the preferred embodiments illustrated in the examples, but must instead receive the broadest possible interpretation in accordance with the description as a whole.

REFERENCES

1. H. Yamamoto and H. Mori, in *Lithium-Ion Batteries: Science and Technologies*, 2009, pp. 163-179.
2. A. Guerfi, M. Kaneko, M. Petitclerc, M. Mori and K. Zaghib, *Journal of Power Sources*, 2007, 163, 1047-1052.
3. S. F. Lux, F. Schappacher, A. Balducci, S. Passerini and M. Winter, *Journal of The Electrochemical Society*, 157, A320-A325.
4. B. Tran, I. O. Oladeji, Z. Wang, J. Calderon, G. Chai, D. Atherton and L. Zhai, *Electrochimica Acta*, 88, 536-542.
5. S. L. Chou, Y. Pan, J. Z. Wang, H. K. Liu and S. X. Dou, *Physical Chemistry Chemical Physics*, 16, 20347-20359.
6. J.-T. Lee, Y.-J. Chu, X.-W. Peng, F.-M. Wang, C.-R. Yang and C.-C. Li, *Journal of Power Sources*, 2007, 173, 985-989.
7. Z. P. Cai, Y. Liang, W. S. Li, L. D. Xing and Y. H. Liao, *Journal of Power Sources*, 2009, 189, 547-551.
8. L. Gong, M. H. T. Nguyen and E.-S. Oh, *Electrochemistry Communications*, 29, 45-47.
9. H.-K. Park, B.-S. Kong and E.-S. Oh, *Electrochemistry Communications*, 13, 1051-1053.
10. D. Nguyen, H. S. Zondanos, J. M. Farrugia, A. K. Serelis, C. H. Such and B. S. Hawkett, *Langmuir*, 2008, 24, 2140-2150.
11. M. H. T. Nguyen and E.-S. Oh, *Electrochemistry Communications*, 35, 45-48.
12. J.-C. Daigle, A. A. Arnold, L. Piche and J. P. Claverie, *Polymer Chemistry*, 4, 449-452.
13. N. Kessel, D. R. Illsley and J. L. Keddie, *Journal of Coatings Technology Research*, 2008, 5, 285-297.
14. A. Pich, Y. Lu and H. J. Adler, *Colloid and Polymer Science*, 2003, 281, 907-915.

The invention claimed is:

1. An electrode for a battery comprising an electrode current collector having, over at least part of its surface, a membrane formed by a mixture of copolymer and at least one active material,
   wherein the copolymer comprises:
      a monomer A with a molar ratio a varying between around 0.01 and around 0.20,
      a monomer B with a molar ratio b varying between around 0.15 and around 0.4, and
      a monomer C with a molar ratio c varying between around 0.50 and around 0.70, the monomer A being a hydrophilic monomer comprising a pendant chain of poly(ethylene oxide) (POE) with a low molar weight, the monomer B being a hydrophobic monomer with a glass transition temperature (Tg) of around −30° C. or less, the monomer C being more hydrophobic than the monomer B and having a glass transition temperature (Tg) of around 80° C. or more, said monomers being organized in:
a hydrophilic segment,
a hydrophobic segment, and
an intermediate segment located between the hydrophilic segment and the hydrophobic segment, the intermediate segment having a hydrophilicity midway between the hydrophilicity of the hydrophilic segment and the hydrophilicity of the hydrophobic segment, the hydrophilic segment comprising the monomer A and part of the monomer B, and the intermediate segment and the hydrophobic segment comprising the rest of the monomer B as well as the monomer C, the intermediate segment being enriched with the monomer B relative to the hydrophobic segment and the hydrophobic segment being enriched with the monomer C relative to the intermediate segment.

2. The electrode according to claim 1, wherein the copolymer further comprises a monomer D, which is a monomer chemically cross-linkable in water, in a molar ratio d varying between around 0 and around 0.10.

3. The electrode according to claim 1, wherein the copolymer has the following formula:

$$-(A)_a-(B)_b-(C)_c-(D)_d-,$$

wherein:
A, B, C and D respectively representing monomers A, B, C and D and
a, b, c and d respectively representing molar ratios a, b, c and d.

4. The electrode according to claim 1, wherein the molar mass of the POE pendant chain varies between around 300 and around 2000 g/mol.

5. The electrode according to claim 1, wherein the monomer A is polyethylene glycol methyl acrylate or polyethylene glycol methyl methacrylate.

6. The electrode according to claim 5, wherein the monomer A has the formula:

wherein R is a hydrogen atom or a methyl group and x represents a number of POE repetition units such that the molar mass of the POE chain varies between around 300 and around 2000 g/mol.

7. The electrode in claim 1, wherein the glass transition temperature (Tg) of the monomer B varies between around −30° C. and about −60° C.

8. The electrode according to claim 1, wherein the monomer B is:

n-butyl acrylate;
another acrylate or methacrylate having a Tg of around −30° C. or less;
butyl vinyl ether, or
a mixture thereof.

9. The electrode according to claim 1, wherein the monomer C is styrene or a derivative thereof, acrylonitrile, 2-vinyl-4,5-dicyanoimidazole, methyl methacrylate, tert-butyl methacrylate, morpholine acryloyl, phenyl methacrylate, ferrocene vinyl, ferrocene metal that acrylate or a mixture thereof.

10. The electrode according to claim 1, comprising acrylamide diketone as monomer D.

11. The electrode according to claim 1, wherein the monomer A is polyethylene glycol methyl acrylate or polyethylene glycol methyl methacrylate, the monomer B is n-butyl acrylate and the monomer C is styrene, the copolymer has the following formula:

wherein:
R is a hydrogen atom or a methyl group,
x represents a number of POE repetition units such that the molar mass of the POE chain varies between around 300 and around 2000 g/mol.

12. The electrode according to claim 1, wherein the copolymer further comprises acrylamide diketone as monomer D, the copolymer has the following formula:

wherein
R is a hydrogen atom or a methyl group,
x represents a number of POE repetition units such that the molar mass of the POE chain varies between around 300 and around 2000 g/mol, and
d is a molar ratio varying between around 0 and around 0.10.

13. A binder for a battery electrode comprising a copolymer,
wherein the copolymer comprises:
a monomer A with a molar ratio a varying between around 0.01 and around 0.20,
a monomer B with a molar ratio b varying between around 0.15 and around 0.4, and a monomer C with a molar ratio c varying between around 0.50 and around 0.70, the monomer A being a hydrophilic monomer comprising a pendant chain of poly(ethylene oxide) (POE) with a low molar weight, the monomer B being a hydrophobic monomer with a glass transition temperature (Tg) of around −30° C. or less, the monomer C being more hydrophobic than the monomer B and having a glass transition temperature (Tg) of around 80° C. or more, said monomers being organized in:
  a hydrophilic segment,
  a hydrophobic segment, and
  an intermediate segment located between the hydrophilic segment and the hydrophobic segment, the intermediate segment having a hydrophilicity midway between the hydrophilicity of the hydrophilic segment and the hydrophilicity of the hydrophobic segment, the hydrophilic segment comprising the monomer A and part of the monomer B, and the intermediate segment and the hydrophobic segment comprising the rest of the monomer B as well as the monomer C, the intermediate segment being enriched with the monomer B relative to the hydrophobic segment and the hydrophobic segment being enriched with the monomer C relative to the intermediate segment.

14. A binder suspension comprising a copolymer suspended in water,
  wherein the copolymer comprises:
    a monomer A with a molar ratio a varying between around 0.01 and around 0.20,
    a monomer B with a molar ratio b varying between around 0.15 and around 0.4, and
    a monomer C with a molar ratio c varying between around 0.50 and around 0.70, the monomer A being a hydrophilic monomer comprising a pendant chain of poly(ethylene oxide) (POE) with a low molar weight, the monomer B being a hydrophobic monomer with a glass transition temperature (Tg) of around −30° C. or less, the monomer C being more hydrophobic than the monomer B and having a glass transition temperature (Tg) of around 80° C. or more, said monomers being organized in:
    a hydrophilic segment,
    a hydrophobic segment, and
    an intermediate segment located between the hydrophilic segment and the hydrophobic segment, the intermediate segment having a hydrophilicity midway between the hydrophilicity of the hydrophilic segment and the hydrophilicity of the hydrophobic segment, the hydrophilic segment comprising the monomer A and part of the monomer B, and the intermediate segment and the hydrophobic segment comprising the rest of the monomer B as well as the monomer C, the intermediate segment being enriched with the monomer B relative to the hydrophobic segment and the hydrophobic segment being enriched with the monomer C relative to the intermediate segment.

15. The binder suspension according to claim 14, comprising around 10% and around 20%, in percentage by weight, of the copolymer based on the total weight of the suspension.

16. The binder suspension according to claim 14, additionally comprising a surfactant.

17. The binder suspension according to claim 16, comprising between around 3% and around 7%, in percentage by weight, of the surfactant based on the total weight of the suspension.

18. The binder suspension according to claim 14, wherein the copolymer is cross-linked.

19. A suspension for an electrode, comprising a binder suspension as defined in claim 14 and additionally comprising an active material for a lithium-ion battery electrode.

20. The electrode according to claim 1, wherein the electrode is an electrode for a lithium-ion battery.

21. The according to claim 13, wherein the binder is a binder for a lithium-ion battery electrode.

* * * * *